United States Patent
Rumbaugh et al.

(10) Patent No.: US 10,097,060 B2
(45) Date of Patent: Oct. 9, 2018

(54) SYSTEMS AND METHODS FOR PREVENTING ELECTRICAL FAULTS ASSOCIATED WITH MOTOR LEADS

(71) Applicant: Baker Hughes Incorporated, Houston, TX (US)

(72) Inventors: Michael R. Rumbaugh, Tulsa, OK (US); Ryan P. Semple, Owasso, OK (US); Jeffrey G. Frey, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 685 days.

(21) Appl. No.: 14/575,987

(22) Filed: Dec. 18, 2014

(65) Prior Publication Data

US 2016/0181884 A1 Jun. 23, 2016

(51) Int. Cl.
*H02K 5/132* (2006.01)
*H01R 13/523* (2006.01)
*H02K 11/00* (2016.01)
*H02K 5/22* (2006.01)

(52) U.S. Cl.
CPC ........... *H02K 5/132* (2013.01); *H01R 13/523* (2013.01); *H02K 5/225* (2013.01); *H02K 11/0094* (2013.01)

(58) Field of Classification Search
CPC .. H02K 5/132; H02K 11/0094; H02K 13/523; H02K 5/225; H01R 13/523; H01R 4/20; H01R 4/70; H01R 43/005; H02G 1/14; H02G 15/117; H02G 15/18
See application file for complete search history.

(56) References Cited

U.S. PATENT DOCUMENTS

| | | | | |
|---|---|---|---|---|
| 2,219,318 A * | 10/1940 | Hoover | ................. | H02K 5/132 310/112 |
| 2,311,805 A * | 2/1943 | Yost | ..................... | H01B 17/306 174/18 |
| 6,167,965 B1 * | 1/2001 | Bearden | ................ | E21B 43/121 166/105.5 |
| 6,484,801 B2 * | 11/2002 | Brewer | ................ | E21B 17/028 166/242.6 |
| 8,123,549 B2 * | 2/2012 | Jazowski | ................ | H02G 3/22 439/426 |
| 8,297,345 B2 * | 10/2012 | Emerson | .............. | H01R 13/523 166/242.6 |
| 2006/0148304 A1 * | 7/2006 | Kennedy | ............. | H01R 13/405 439/404 |

* cited by examiner

*Primary Examiner* — Joshua Benitez Rosario
*Assistant Examiner* — Leda Pham
(74) *Attorney, Agent, or Firm* — Sprinkle IP Law Group

(57) ABSTRACT

Systems and methods for protecting motor lead from debris and fluid contamination. In one embodiment, detachable, flexible lead wires within an ESP motor are covered by protective sleeves that are sealed against the end connectors of the leads. The end connectors are coupled to corresponding terminals in an epoxy fixture of the motor and a motor head in a manner that provides a seal between them. The sealed sleeve and end connectors prevent debris and contaminants in the fluid within the motor from reaching the conductive elements of the motor leads, thereby preventing accumulations of debris and contaminants that could otherwise cause electrical faults.

14 Claims, 5 Drawing Sheets

SYSTEMS AND METHODS FOR PREVENTING ELECTRICAL FAULTS ASSOCIATED WITH MOTOR LEADS

BACKGROUND

Field of the Invention

The invention relates generally to downhole electric equipment, and more particularly to systems and methods for improving the reliability electrical connections between power cables and the windings of motors for electric submersible pumps (ESP's).

Related Art

Electric submersible pump (ESP) systems are commonly positioned in wells and used to pump fluids (e.g., oil) from the wells. AC power that is suitable to drive the ESP systems is produced at the surface of the wells and is delivered to the ESP systems via power cables that extend into the wells. The power cables are typically spliced to motor lead extensions, which are in turn connected to the motor of the ESP using a "pothead" connector. Within the housing of the ESP's motor, flexible leads are coupled between the pothead connector and the motor windings in the motor's stator.

In a conventional ESP, the lower ends of the flexible leads within the motor are connected to the stator windings and are wrapped with a dielectric tape before being encapsulated in epoxy. The flexible leads extend upward out of the epoxy encapsulant through an epoxy fixture. The upper ends of the flexible leads are crimped to terminal pins that are positioned with an insulating block that is positioned in an aperture through the motor head. The pothead connector is fastened to the motor head over this aperture, connecting the flexible leads to the motor lead extension.

The interior of the motor, including the volume through which the flexible leads extend, is typically filled with dielectric oil to allow the pressure inside the motor to be equalized to the pressure external to the motor and to provide additional insulating properties. The i-block is designed to allow oil from the motor to flow between the i-block and the motor head, thereby filling any open spaces within the junction of the pothead connector and the motor terminals. One of the problems with this configuration is that, as the motor is operated, contaminants such as water and small debris particles in the oil may accumulate at the pothead junction. This may eventually cause short-circuits between different conductors within the junction, resulting in corresponding power failures.

The connection of the flexible leads to the motor windings presents another problem in the conventional design. When the motor is being constructed and tested, it may be discovered that there are one or more faults in the electrical pathway between the power cable and the motor windings. Because the connection between the flexible leads and the motor windings is embedded in the epoxy encapsulant, it is very difficult, if not impossible, to replace or repair the flexible leads and the connections to the motor windings. If the faults cannot be repaired, the motor itself may have to be scrapped, which is very costly.

It would therefore be desirable to provide improved means for coupling the motor windings to the conductors of the power cable.

SUMMARY

This disclosure is directed to systems and methods for sealing motor lead wires and electrical junctions with the lead wires to protect them from debris and fluid contamination. Embodiments of the present invention include systems and methods implemented in motors of downhole equipment such as ESP's, where the motor lead wires within the motor and the connections at the ends of the lead wires are protected from debris and fluid contamination. The lead wires are sealed from the epoxy fixture at the end of the motor's stator to the i-block in the motor head. This isolates the electrical conductors from fluids in the motor and any potential conductive contamination in the fluids, allowing the motor to operate with water contamination in the i-block area. The motor leads are enclosed by a protective sleeve made from a material such as ePTFE insulation that extends between the connectors at the ends of the leads. This ePTFE insulation material is resistant to both water and chemicals that may be present in a well environment. Connectors at the ends of the motor leads are sealed against the epoxy fixture and the motor head to prevent fluids in the motor from reaching the conductors of the motor leads, or the junctions with other electrically conductive elements.

One exemplary embodiment is a motor for use in an ESP. The motor comprises a stator having a stator core with one or more motor windings installed therein. The stator core is positioned in a stator housing, and an epoxy fixture positioned the end of the stator housing is sealed against the stator housing. Each of the one or more motor windings is electrically coupled to a first set of terminals that are secured to the epoxy fixture. A cavity is formed between the stator and the motor head, and a set of flexible motor leads extend from the terminals in the epoxy fixture to a second set of electrical terminals that are positioned in corresponding apertures through the motor head. These terminals are coupled through the apertures to a motor lead extension external to the motor. Each of the flexible motor leads includes an electrical conductor which may be insulated, and a protective sleeve that is positioned around the conductor and is sealed against the end connectors of the motor lead and/or the epoxy fixture and motor head, thereby preventing fluid in the cavity from contacting the electrical conductors and junctions of the motor leads.

In one embodiment, each of the electrical terminals in the epoxy fixture is embedded in the epoxy fixture, while in other embodiments, the terminals are sealing secured to the epoxy fixture. These terminals may, for example, be twist-and-lock terminals that allow quick connection of the motor leads to the terminals. In some embodiments, the terminals in the motor head are formed by insulating bodies that have conductive pins which extend therethrough. The insulating bodies may be formed with ceramics or other insulating materials, and may be press-fit into the apertures, bonded to the motor head, or otherwise sealed against the motor head.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
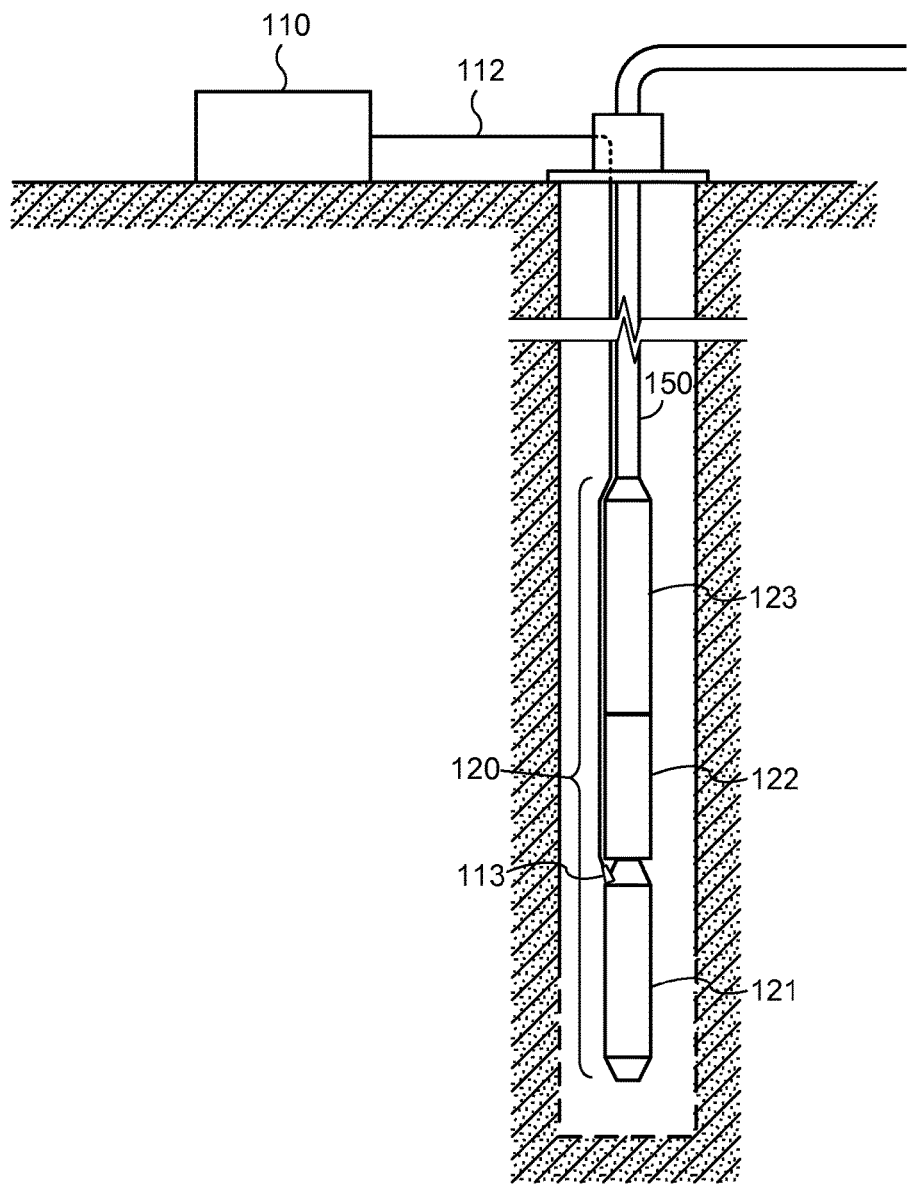
FIG. 1 is a diagram illustrating the general structure of a conventional ESP system.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for coupling the power cable of an ESP system to the motor of an ESP system in a manner that reduces or eliminates one or more of the problems described above. This is accomplished by providing a protective sleeve over each motor lead, where the protective sleeve is sealed against the end connectors and the end connectors are sealed against the epoxy fixture and motor head, thereby preventing debris and contaminants from contacting the conductive components of the motor leads.

Referring to FIG. 1, a diagram illustrating a conventional ESP system is shown. In this embodiment, an ESP system is installed in a well for the purpose of producing oil, gas or other fluids. An ESP 120 is coupled to the end of tubing string 150, and the ESP and tubing string are lowered into the wellbore to position the ESP in a producing portion of the well (as indicated by the dashed lines at the bottom of the wellbore). Surface equipment which includes a drive system 110 is positioned at the surface of the well. Drive system 110 is coupled to ESP 120 by power cable 112, which runs down the wellbore along tubing string 150. Power cable 112 extends from the drive unit at the surface of the well to a point near the ESP. At this point (typically 10-50 feet above the ESP), the primary cable is connected (e.g., spliced) to a motor lead extension. The motor lead extension runs from the primary cable to the motor, and is connected to the motor by a pothead connector 113.

In this embodiment, ESP 120 includes a motor section 121, seal section 122, and pump section 123. ESP 120 may include various other components, such as gauge packages, which will not be described in detail here because they are well known in the art and are not important to a discussion of the invention. Motor section 121 is coupled to power cable 112, and is driven by AC power signals (typically three-phase AC waveforms) received through the cable. Motor section 121 drives pump section 123, thereby pumping the oil or other fluid through the tubing string and out of the well. Power for the non-motor components of the system (e.g., gauges, telemetry communication systems, etc.) may be provided from motor section 121 to the other components.

Figure 2:
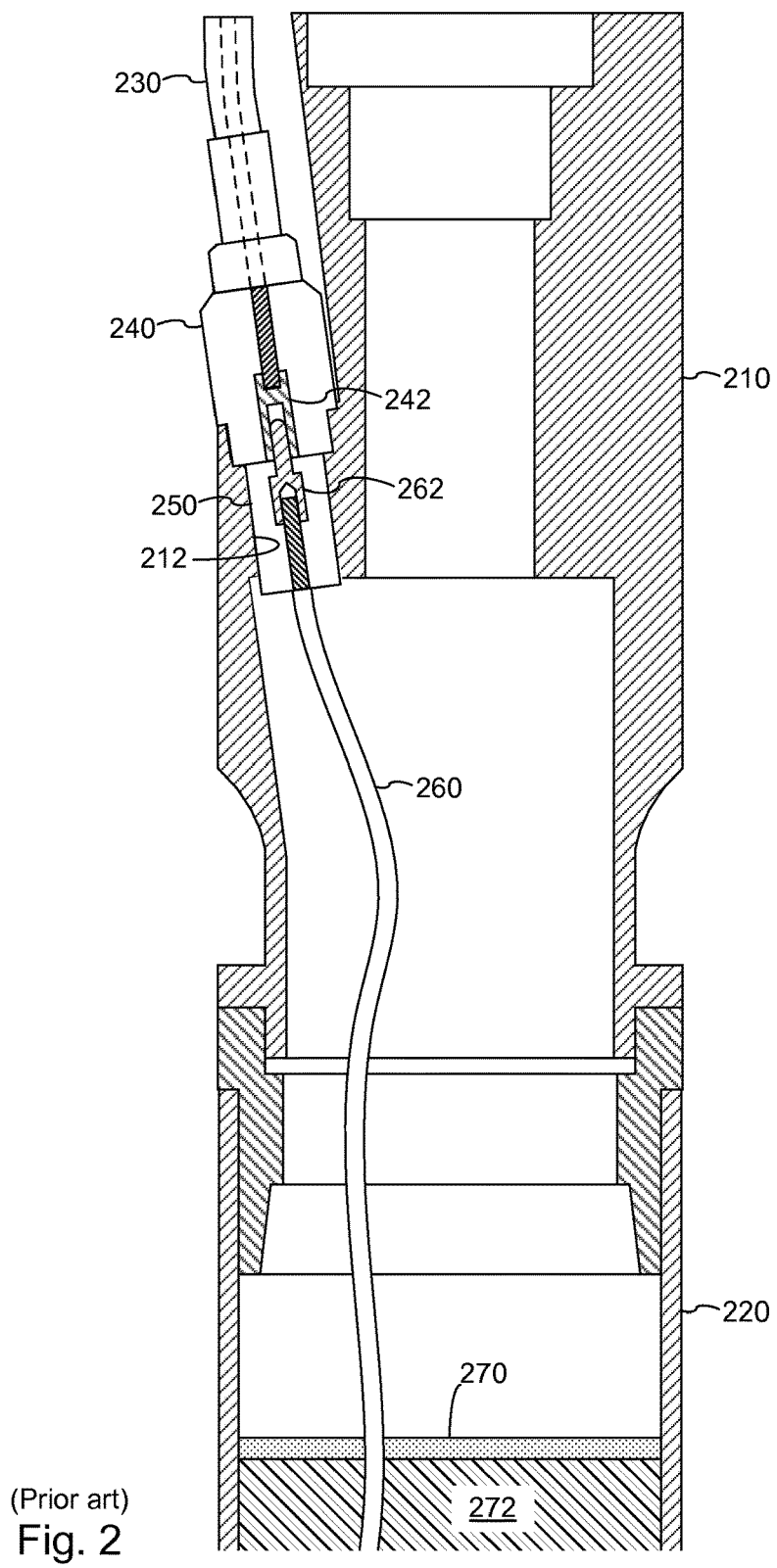
FIG. 2 is a diagram illustrating the structure of power connections in a conventional ESP motor.

Referring to FIG. 2, a diagram illustrating the power connections in a conventional ESP motor is shown. In this example, a motor head 210 is secured to a housing 220 that forms the body of the motor's stator. A motor lead extension 230 extends through a pothead connector 240, which is secured to motor head 210 at aperture 212, which extends through the motor head. A seal is typically positioned between pothead connector 240 and motor head 210 to prevent well fluids from leaking through the aperture and into the interior of the motor.

An i-block 250 is positioned in aperture 212. The upper end of a flexible motor lead 260 is connected (e.g., crimped) to a pin terminal 262, which is inserted into i-block 250. When pothead connector 240 is secured to motor head 210, a female terminal 242 which is connected to the lower end of motor lead extension 230 mates with pin terminal 262 and electrically couples flexible motor lead 260 to the motor lead extension. Flexible motor lead 260 extends downward from i-block 250 and through epoxy fixture 270.

The lower end of flexible motor lead 260 is connected to one of the windings of the motor (not shown). The volume below epoxy fixture 270 is filled with epoxy 272, and the connection between the lower end of flexible motor lead 260 and the motor winding is embedded in the epoxy. The volume above epoxy fixture 270 is filled with dielectric oil. I-block 250 is designed to allow dielectric oil in the motor to reach the space between the i-block and the motor head.

As noted above, there are several problems with the configuration illustrated in FIG. 2. Because the i-block is designed to allow the dielectric oil to flow between the i-block and the motor head, contaminants in the oil may accumulate in this area, and may cause short-circuits that result in failure of the system. Additionally, because the connection between the flexible motor lead and the corresponding motor winding is embedded in the epoxy encapsulant below the epoxy fixture, it may be difficult or even impossible to replace or repair the flexible motor lead if it is determined that there is an electrical fault at the connection of the motor lead to the motor winding.

Figure 3:
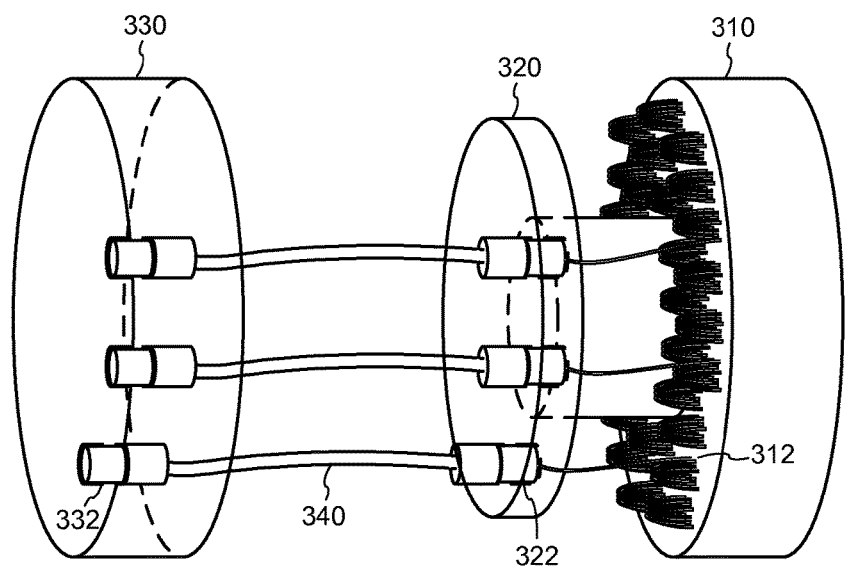
FIG. 3 is a conceptual diagram illustrating the connection of a set of motor windings to terminals in a motor head using detachable sealed motor leads in accordance with one embodiment.

Embodiments of the present invention therefore incorporate several improvements over the configuration of FIG. 2. Referring to FIG. 3, a conceptual diagram illustrating these improvements in one embodiment is shown. FIG. 3 is a simplified illustration of the electrical connections between the motor head and the stator windings. Stator core 310 has multiple motor windings (e.g., 312). Each of the motor windings is connected to a terminal (e.g., 322) which is embedded in an epoxy fixture 320. The volume between the end of stator core 310 and epoxy fixture 320 is filled with an encapsulant such as epoxy.

Each of the terminals (e.g., 322) embedded in epoxy fixture 320 is electrically coupled to a corresponding terminal (e.g., 332) that is installed in motor head 330 by a flexible motor lead (e.g., 340). The motor lead is flexible in order to allow it to be positioned in an annular space in the motor head, thereby facilitating assembly of the motor. The flexible motor lead may be referred to as a "flex lead". The flexible motor lead has connectors at each end which are designed to be sealingly connected to the terminals (e.g., 332, 322) in motor head 330 and epoxy fixture 320. A protective sleeve covers the flexible motor lead and is sealed against the lead's end connectors to prevent contaminants that surround the motor lead from contacting the portion of the lead between the end connectors. When the flexible motor leads (e.g., 340) are installed between motor head 330 and epoxy fixture 320 and the volume between the motor head and the epoxy fixture is filled with dielectric oil, contaminants in the oil are prevented from contacting the components that form the electrical pathway from the motor windings to the terminals in the motor head.

This design provides several advantages over conventional designs. For instance, because the flexible motor leads and the connections to the terminals are sealed against contaminants in the dielectric oil, these contaminants cannot accumulate and cause electrical faults in the electrical pathway between the motor head and the motor windings. Further, because the ends of the flexible motor leads are connected to the epoxy fixture terminals, rather than being embedded in the epoxy, they can be removed and repaired or replaced if necessary to correct faulty connections to the motor windings. Still other advantages may be apparent to those of skill in the art.

Figure 4:
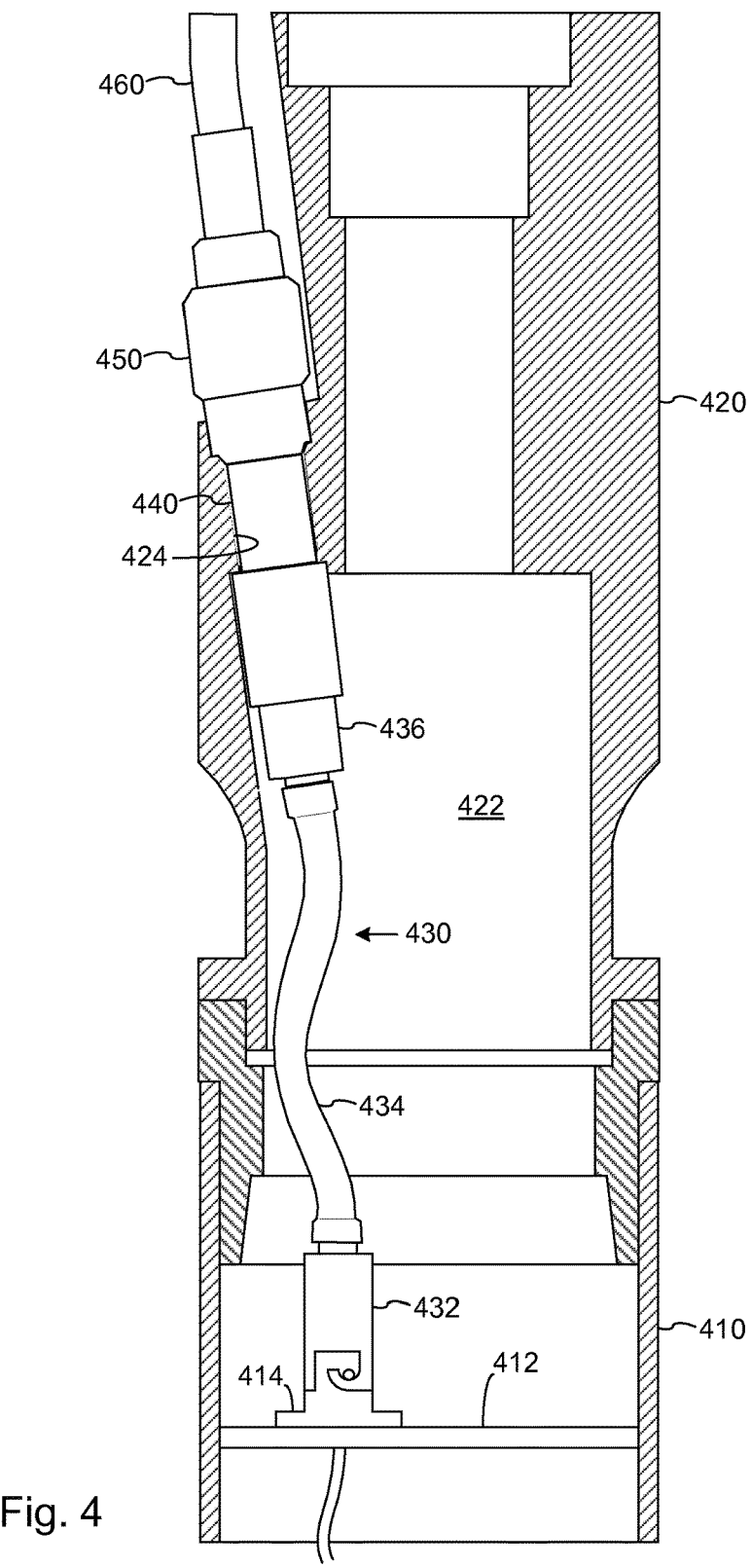
FIG. 4 is a diagram illustrating a partial cross-sectional view of the upper end of an ESP motor in accordance with one embodiment.

Referring to FIG. 4, a diagram illustrating a partial cross-sectional view of one embodiment is shown. In this figure, the motor head, stator housing and epoxy fixture are shown in cross-section, while the remainder of the components are not.

In this embodiment, a stator core having a set of motor windings is installed in a stator housing 410 to form a stator body. Only the upper end of the stator body is shown in the figure. An epoxy fixture 412 is positioned between the upper end of stator housing 410, and the upper end of the stator core to allow the volume between them to be filled with an encapsulant such as epoxy. The epoxy holds the wires of the motor windings in place and prevents damage that could result from movement of the wires. The wire of each of the motor windings extends through the epoxy and to a corresponding terminal 414 that is embedded in epoxy fixture 412. Terminal 414 is sealed against epoxy fixture 412. Terminal 414, epoxy fixture 412 and the epoxy in the end of the stator prevent fluids from contacting the motor windings and damaging the motor.

A motor head 420 is secured to stator housing 410, enclosing a volume 422. A flexible motor lead 430 extends through volume 422 to an aperture 424 through motor head 420. A coupling 440 is positioned in aperture 424. Flexible motor lead 430 is connected to coupling 440, which is in turn connected via pothead connector 450 to a motor lead extension 460. Motor lead extension 460 is spliced to a power cable that extends from the position of the motor downhole in a well to a power source at the surface of the well. The system thereby forms an electrical pathway from the power source to the windings of the motor.

Flexible motor lead 430 has a flexible, insulated conductor that extends from a lower end connector 432 to an upper end connector 436. Lower end connector 432 is sealingly coupled to terminal 414. In other words, when lower end connector 432 is connected to terminal 414, a seal is formed between them, so that fluids in volume 422 cannot reach the electrical conductors at this point. Similarly, upper end connector 436 is sealingly connected to coupling 440 so that fluids in volume 422 cannot reach the electrical conductors at this point. Flexible motor lead 430 also includes a protective sleeve 434 that is sealingly coupled at its upper end to upper end connector 436, and at its lower end to lower end connector 432. Protective sleeve 434 may be made of a material such as expanded polytetrafluoroethylene (ePTFE), which is gas-permeable, but liquid-impermeable, The sleeve could also be made of polyetheretherketone (PEEK) or other insulating materials as well. The use of this protective sleeve in flexible motor lead 430 prevents fluids such as oil and water in volume 422 from reaching any of the conductive elements that form the electrical pathway from the motor windings to the motor lead extension.

Flexible motor lead 430 may be installed by first connecting upper end connector 436 to coupling 440, positioning motor head 420 near stator housing 410, and then connecting lower end connector 432 to terminal 414. Since upper end connector 436 is connected first, it can be secured to coupling 440 relatively easily. When lower end connector 432 is connected to terminal 414, motor head 420 must be relatively close to stator housing 410 in order to minimize the length of flexible motor lead 430. Lower end connector 432 therefore uses a type of connector that can be pushed onto terminal 414 and twisted to lock the connector in place. These twist-and-lock connectors or other types of boltless connectors may thereby facilitate assembly of the motor.

Figure 5:
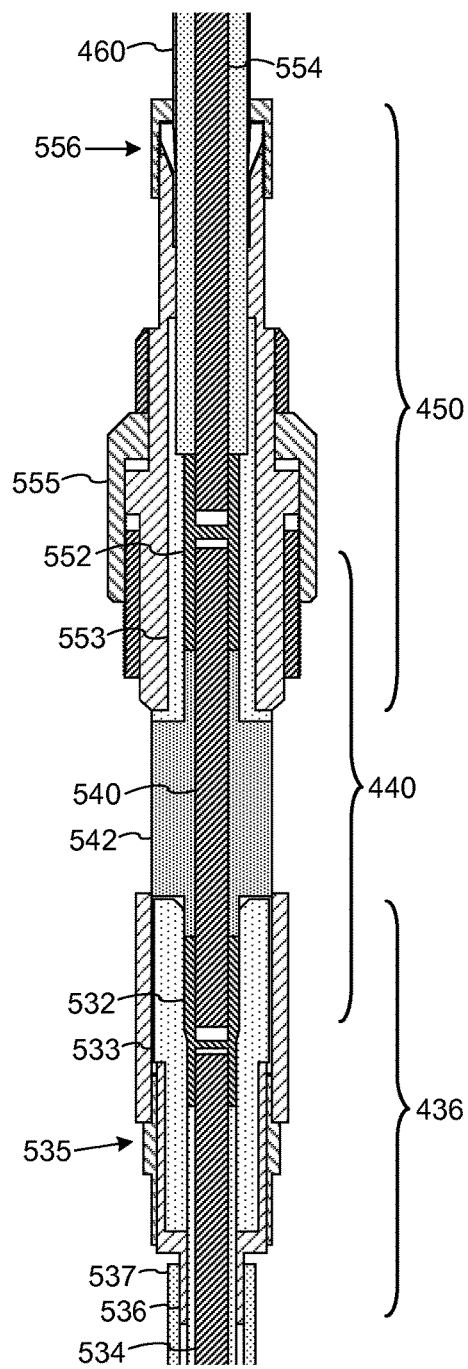
FIG. 5 is a diagram illustrating the structure of the connectors at the motor head in accordance with one embodiment.

Referring to FIG. 5, a diagram illustrating the structure of the connectors at the motor head is shown. FIG. 5 is a cross-sectional view of the connectors.

As explained above, coupling 440 is positioned within an aperture in the motor head. Coupling 440 includes a conductive pin 540 which is surrounded by an insulating body 542. Insulating body 542 may, for example, be a ceramic material that electrically insulates pin 540 from the motor head. Insulating body 542 may be pressed into the aperture in the motor head to form an interference fit between them. Alternatively, insulating body 542 may be bonded to the motor head using ceramic-to-metal bonding technologies. Insulating body 542 may also be bonded to pin 540.

Upper end connector 436 in this example is a female connector that is configured to mate with the lower male end of coupling 440. Upper end connector 436 has a conductive female terminal 532 that accepts pin 540 of coupling 440. Terminal 532 is connected to (e.g., crimped onto) conductor 534 of the flexible motor lead. Terminal 532 is surrounded by an insulating body 533, which is enclosed in a housing 535. In this example, housing 535 has multiple parts that are secured to each other to form the housing. Housing 535 has an extension 536 that protrudes downward around the insulated conductor of the flexible motor lead. Protective sleeve 537 fits over extension 536 and forms a seal against it.

It should be noted that a small gap between the insulated conductor 534 and sleeve 537 is depicted in FIG. 5. This gap may, in some embodiments, be filled with a substantially non-compressible fluid (e.g., dielectric oil) to equalize the pressure between the interior and exterior of the sleeve. In other embodiments, the protective sleeve may be sized to eliminate the gap.

Pothead connector 450, like upper end connector 436, is a female connector that is configured to mate with coupling 440 in this embodiment. Pothead connector 450 has a female terminal 552 that accepts the upper end of pin 540. Terminal 552 is connected to conductor 554 of motor lead extension 460. Terminal 552 is surrounded by an insulating body 553. A multi-part housing 555 encloses the insulating material and the conductor. Motor lead extension 460 is secured to housing 555 by a compression fitting 556 at the upper end of the housing.

As noted above, coupling 440 is sealed against the motor head. Pothead connector 450 is sealed against the exterior of motor head when it is secured (e.g., bolted or threaded into) the motor head. This prevents well fluids external to the motor from reaching the junction of the conductors of coupling 440 and motor lead extension 460. When it is secured to the motor head, upper end connector 436 also forms a seal against the motor head. This seal prevents fluids within the motor (e.g., dielectric oil and contaminants within the oil) from reaching the junction of the conductors of coupling 440 and flexible motor lead 430.

Figure 6:
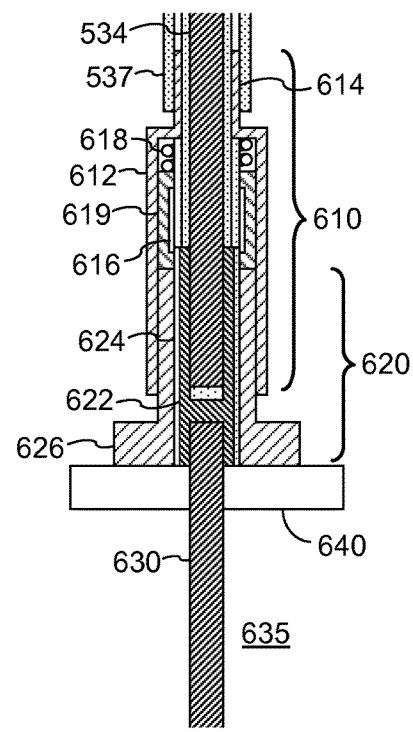
FIG. 6 is a diagram illustrating the structure of the connection at the epoxy fixture in accordance with one embodiment.

Referring to FIG. 6, a diagram illustrating the structure of the connection at the epoxy fixture is shown. FIG. 6 is a cross-sectional view of the connection. In this example, the connection is formed by a lower end connector 610 and a terminal 620. Lower end connector 610 is coupled to the lower end of conductor 534 of the flexible motor lead. Terminal 620 is coupled to a conductor 630 that extends from one of the motor windings, through an epoxy-filled volume 635 and epoxy fixture 640 to terminal 620.

Terminal 620 includes a conductive female terminal portion 622 that is connected (e.g., by crimping) to the upper end of conductor 630. Female terminal portion 622 is positioned within a terminal housing 626 that is secured to epoxy fixture 640. An electrically insulating material 624 is positioned between female terminal portion 622 and terminal housing 626.

Conductor 534 of the flexible motor lead extends into a housing 612 of lower end connector 610. Conductor 534 extends downward through the housing to reach female terminal portion 622 of terminal 620. A layer of electrically insulating material 616 is positioned between conductor 534 and housing 612. Protective sleeve 537 is sealed against an upper portion 614 of connector housing 612 to prevent fluids in the motor from reaching the conductor. The connection formed by connector 610 and terminal 620 is a twist-and-lock connection, so a spring 618 is positioned between a shoulder at the upper end of housing 612 and sliding portion 619 of the connector. When connector 610 is pushed down onto terminal 620, the spring is compressed. When connector 610 is twisted and released, the spring pushes housing 612 upward slightly to a locked position.

It should be noted that the embodiments that are described above are exemplary, and alternative embodiments may have different structures. For instance, the specific structures of the upper end connector and lower end connector may vary from the specific structures shown in FIGS. 5 and 6. Other variations are possible as well.

For example, in one alternative embodiment, a flexible metal tube, rather than an insulating sleeve, may be used to encapsulate the lead wire from the epoxy fixture to the i-block. The tube may use compression fittings to connect the leads to the epoxy fixture and to the motor head. As in the embodiments described above, this creates a contamination barrier and prevents the contaminants and debris from reaching the electrical components of the motor leads. The metal tube would need to be flexible to aid in assembly of the motor. This could be achieved by using a corrugated or other flexible type of tube (for example, braided metal hose) over the flexible motor lead. The metal tube, rather than the insulation on the lead wire, is sealed against the compression fitting.

The sealed-lead arrangements described herein could also be used with more conventional i-blocks, or with penetrator-type i-block. In addition, the sealed leads could be used to connect stator wires in a tandem motor configuration, or in a motor-to-wye connection. Another alternative embodiment could use the sealed leads at a motor-to-motor connection. This would allow the connection to water/well fluid and debris resistant.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the described embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed by the claims of the application.

What is claimed is:

1. A motor for use in an electric submersible pump system, the motor comprising:
    a stator having
        a stator core,
        one or more motor windings installed in the stator core,
        a stator housing in which the stator core is positioned,
        an epoxy fixture positioned at a first end of the stator housing and sealed against the stator housing, wherein the epoxy fixture encloses a volume containing epoxy that encapsulates the motor windings, and
        a first set of one or more electrical terminals that are secured to the epoxy fixture, wherein each of the one or more motor windings is electrically coupled to one of the first set of electrical terminals;
    a motor head secured to the stator housing, thereby forming a cavity between the stator and the motor head, wherein the cavity is filled with dielectric oil; and
    one or more flex leads coupled to the first set of electrical terminals, wherein the flex leads extend through the cavity to a second set of electrical terminals that are positioned in one or more apertures through the motor head;
    wherein each of the flex leads includes
        an electrical conductor, and
        a protective sleeve that is positioned around the electrical conductor extends from the epoxy fixture to the motor head and is sealingly coupled between the first set of terminals at the epoxy fixture and the second set of terminals at the motor head, thereby preventing the dielectric oil in the cavity and contaminants therein from contacting the electrical conductor.

2. The motor of claim 1, wherein each of the electrical terminals in the first set is embedded in the epoxy fixture.

3. The motor of claim 1, wherein the flex leads are coupled to corresponding ones of the electrical terminals in the first set are twist-and-lock terminals.

4. The motor of claim 1, wherein in each of the flex leads, a gap is provided between the electrical conductor and the protective sleeve.

5. The motor of claim 4, wherein the gap is filled with a substantially non-compressible fluid.

6. The motor of claim 5, wherein the fluid comprises dielectric oil.

7. The motor of claim 1, wherein each of the electrical terminals in the second set comprises an insulating body having a conductive pin therethrough, wherein the insulating body is positioned in a corresponding one of the apertures and is sealed against the motor head.

8. The motor of claim 7, wherein the insulating body comprises a ceramic body.

9. The motor of claim 7, wherein a material of the insulating body is bonded to the motor head.

10. The motor of claim 7, wherein the insulating body has an interference fit against the motor head.

11. The motor of claim 1, wherein the cavity is filled with dielectric oil.

12. The motor of claim 1, the wherein in each of the flex leads, a layer of electrical insulation is provided between the electrical conductor and the protective sleeve.

13. The motor of claim 1, wherein in each of the flex leads, the electrical conductor is electrically coupled to a first connector that sealingly mates with one of the electrical terminals in the first set and a second connector that sealingly mates with one of the electrical terminals in the second set, wherein the protective sleeve is sealingly coupled to the first connector and the second connector.

14. The motor of claim 1, wherein a volume between the epoxy fixture and the motor windings is filled with epoxy.

* * * * *